(12) United States Patent
Kamakura

(10) Patent No.: US 12,513,457 B2
(45) Date of Patent: Dec. 30, 2025

(54) VIRTUAL IMAGE DISPLAY DEVICE AND ACOUSTIC DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 200 days.

(21) Appl. No.: 18/453,303

(22) Filed: Aug. 21, 2023

(65) Prior Publication Data

US 2024/0073595 A1 Feb. 29, 2024

(30) Foreign Application Priority Data

Aug. 23, 2022 (JP) ................................ 2022-132688

(51) Int. Cl.
| | |
|---|---|
| *H04R 1/34* | (2006.01) |
| *G02B 27/01* | (2006.01) |
| *H04R 1/02* | (2006.01) |
| *H04R 1/08* | (2006.01) |
| *H04R 1/10* | (2006.01) |

(52) U.S. Cl.
CPC ......... *H04R 1/345* (2013.01); *G02B 27/0176* (2013.01); *H04R 1/028* (2013.01); *H04R 1/08* (2013.01); *H04R 1/1008* (2013.01); *H04R 2499/15* (2013.01)

(58) Field of Classification Search
CPC .......... H04R 1/345; H04R 1/028; H04R 1/08; H04R 1/1008; H04R 2499/15
See application file for complete search history.

(56) References Cited

U.S. PATENT DOCUMENTS

| | | | |
|---|---|---|---|
| 2018/0035204 A1* | 2/2018 | Park ........................ | H04M 1/03 |
| 2019/0285913 A1* | 9/2019 | Howell ................... | G02C 5/143 |
| 2020/0341300 A1* | 10/2020 | Eromaki ................ | G02C 11/10 |
| 2022/0015854 A1* | 1/2022 | Behera .................. | A61B 46/40 |

FOREIGN PATENT DOCUMENTS

JP 2005167902 6/2005

* cited by examiner

*Primary Examiner* — Matthew A Eason
(74) *Attorney, Agent, or Firm* — JCIPRNET

(57) ABSTRACT

A virtual image display device includes a display element, a mounting member that fixes the display element, a temple member that is coupled to the mounting member, and a speaker that is mounted on the mounting member. The speaker has an opening portion for sound output at a coupling portion between the mounting member and the temple member.

12 Claims, 14 Drawing Sheets

VIRTUAL IMAGE DISPLAY DEVICE AND ACOUSTIC DEVICE

The present application is based on, and claims priority from JP Application Serial Number 2022-132688, filed Aug. 23, 2022, the disclosure of which is hereby incorporated by reference herein in its entirety.

BACKGROUND

1. Technical Field

The present disclosure relates to a virtual image display device having acoustic equipment and an acoustic device applicable to the virtual image display device or the like.

2. Related Art

As a head-mounted image display device for displaying a virtual image, a device having a sound transmission member for transmitting sound of a speaker to an ear of an observer is known (refer to JP-A-2005-167902).

However, the video display device exemplified in JP-A-2005-167902 has a structure in which a speaker, a sound transmission member, or the like is mounted on a temple, that is, a structure in which the device is disposed near the ear, and in this case, for example, it may be necessary to extend a wiring for transmitting sound to the temple side, or a thickness of the temple may increase to affect mounting characteristics. In addition, it is also conceivable that the arrangement of the speaker or the like be limited accordingly.

SUMMARY

A virtual image display device according to an aspect of the present disclosure includes a display element, a mounting member that fixes the display element, a temple member that is coupled to the mounting member, and a speaker that is mounted on the mounting member, and the speaker has an opening portion for sound output at a coupling portion between the mounting member and the temple member

DESCRIPTION OF EXEMPLARY EMBODIMENTS

An embodiment of a virtual image display device (an image display device) according to the present disclosure will be described below with reference to FIGS. 1, 2 and the like.

Figure 1:
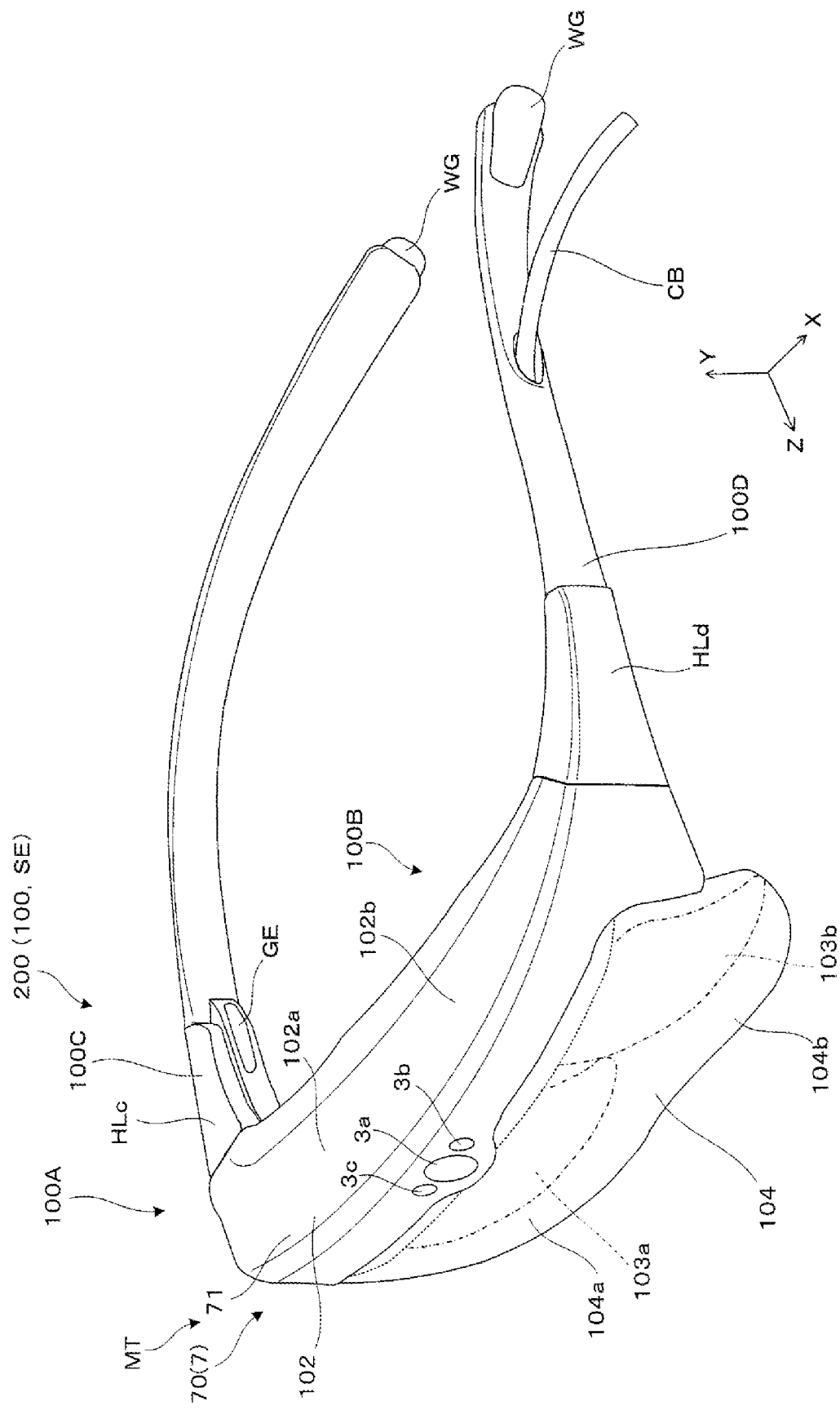
FIG. 1 is a perspective view illustrating an exterior of a virtual image display device according to one embodiment.
Figure 2:
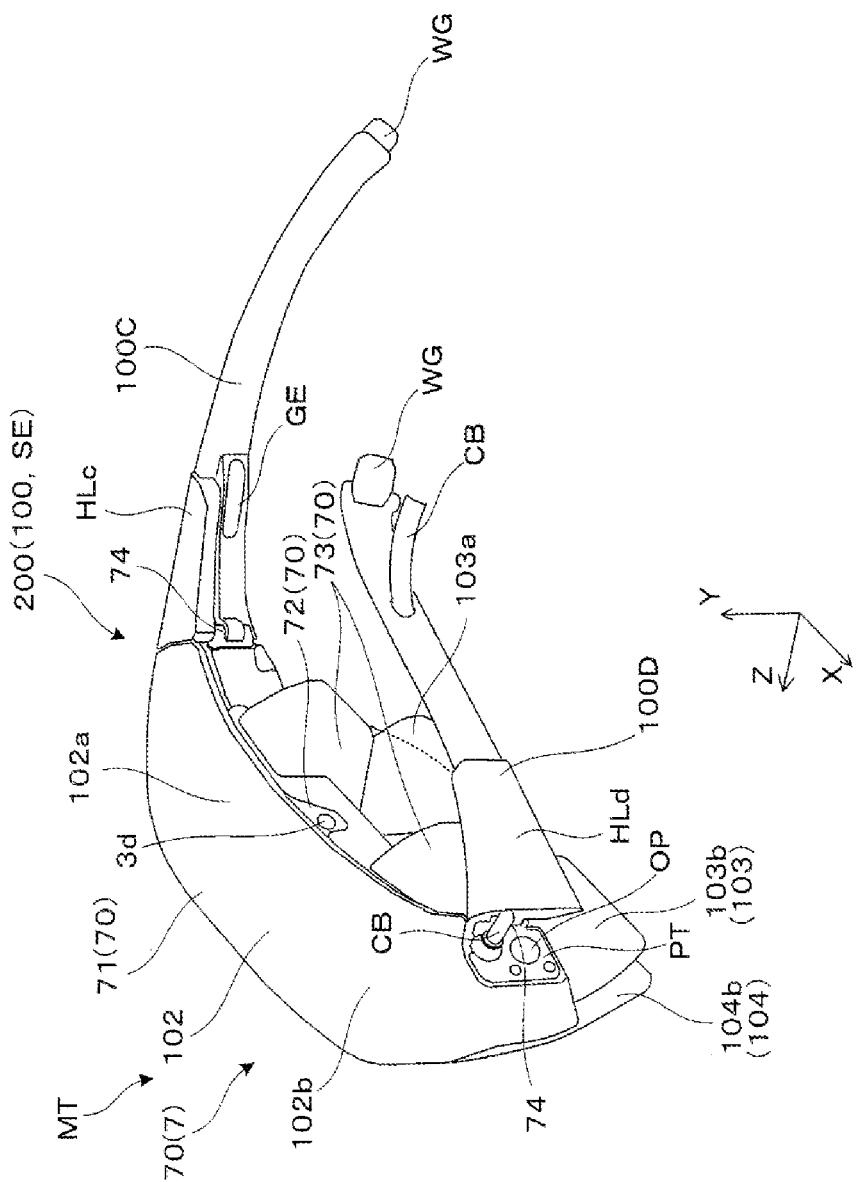
FIG. 2 is a perspective view illustrating the exterior of the virtual image display device from another angle.
Figure 3:
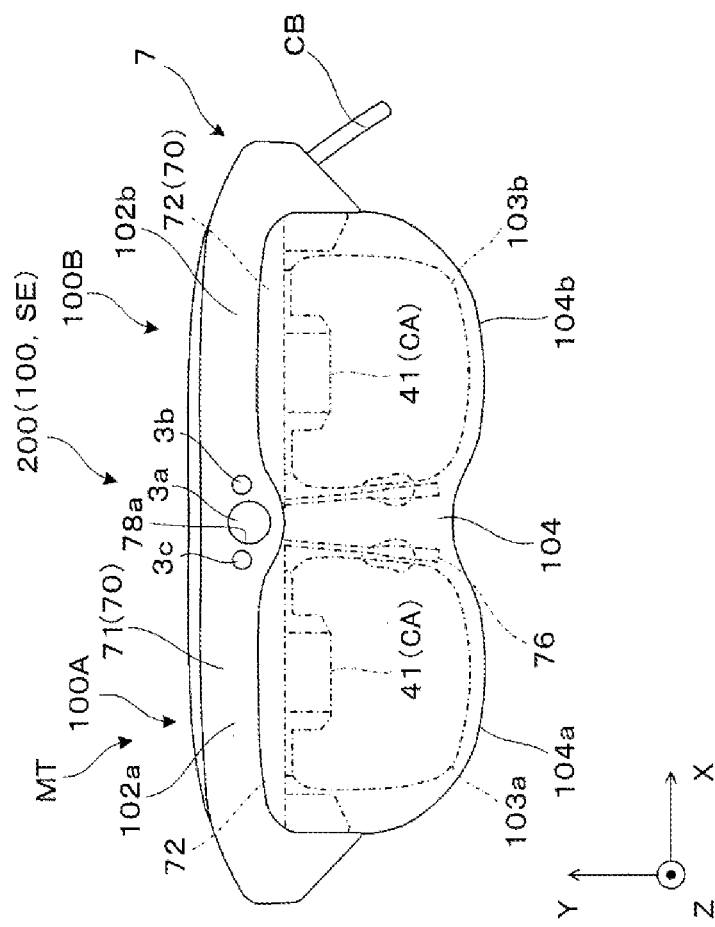
FIG. 3 is a front view of the virtual image display device.

FIG. 1 is a perspective view illustrating an example of an exterior of a head-mounted display (hereinafter, also referred to as HMD) 200 which is an aspect of a virtual image display device (image display device), and FIG. 2 is a perspective view illustrating an exterior of the HMD 200 from another angle. FIG. 3 is a front view of the HMD 200. The HMD 200 allows an observer or a wearer who is wearing the HMD 200 to recognize a video as a virtual image. In FIG. 1 and the like, X, Y, and Z are of an orthogonal coordinate system, a +X direction corresponds to a transverse direction in which both eyes of the observer or wearer wearing the HMD 200 or a virtual image display device 100 are arranged, a +Y direction corresponds to an upward direction orthogonal to the transverse direction in which both eyes EY of the wearer US are arranged, and a +Z direction corresponds to a forward or frontal direction with respect to the wearer US. The ±Y directions are parallel to a vertical axis or a vertical direction.

The HMD 200 includes a first display device 100A for the right eye, a second display device 100B for the left eye, a pair of temple members 100C and 100D that are support device for supporting the display devices 100A and 100B, and a user terminal 90 as an information terminal. The first display device 100A functions independently as a virtual image display device, and is constituted of a first display driving unit 102a disposed at an upper portion thereof, a first combiner 103a that is shaped like a spectacle lens and covers the front of the eye, and a light transmission cover 104a that covers the combiner 103a from the front. Similarly, the second display device 100B functions independently as a virtual image display device, and is constituted of a second display driving unit 102b disposed at an upper portion thereof, a second combiner 103b that is shaped like a spectacle lens and covers the front of the eye, and a light transmission cover 104b that covers the combiner 103b from the front. The temple members 100C and 100D are a mounting members that are mounted on the head of the wearer, and supports the upper end sides of the pair of combiners 103a and 103b and the upper end sides of the pair of light transmission covers 104a and 104b via the display driving units 102a and 102b integrated in exterior. In this specification, one of the first combiner 103a and the second combiner 103b may be referred to as the combiner 103. A combination of the pair of display driving units 102a and 102b is referred to as a driving device 102. A combination of the pair of light transmission covers 104a and 104b is referred to as a shade 104.

The first display device 100A and the second display device 100B are optically identical or mirror-reversed, and a detailed description of the second display device 100B will be omitted.

Referring to FIGS. 2 and 3, the driving device 102 includes a front cover 71, a middle cover 72, and a lower cover 73 as an exterior case 7 or a cover member 70 constituting an exterior. The front cover 71 is an upper case that covers a front portion and an upper portion of the driving device 102. The front cover 71 and the shade 104 are joined and integrated. The middle cover 72 is one of members constituting a lower case that supports optical members and the like incorporated in the driving device 102 at both ends and mainly covers the incorporated components from the front. The lower cover 73 is one of members constituting the lower case that covers the optical members incorporated in the driving device 102 mainly from the rear and below. Hinges 74 are mounted on both ends of the middle cover 72, and support the temple members 100C and 100D, which are a pair of support devices, in a foldable manner. In other words, the hinges 74 are members that are provided at coupling portions between the main body side of the virtual image display device 100 and the temple members 100C and 100D and rotate to be capable of bringing the temple members 100C and 100D into an open state or a closed state.

Here, a case in which the hinges 74 are rotated to bring the temple members 100C and 100D into a state allowing mounting as illustrated in FIG. 1 is referred to as a state in which the temple members 100C and 100D are open, and a case in which the hinges 74 are rotated and the temple members 100C and 100D are folded to be in a fitted state is referred to as a state in which the temple members 100C and 100D are closed. For example, in a state in which the temple members 100C and 100D are opened by rotating the hinges 74, a side end portion of the middle cover 72 is in contact with plate-like members PT provided at end portions of the temple members 100C and 100D. In this case, the plate-like members PT form (at least a part of) coupling portions with the temple members 100C and 100D together with the hinges 74.

Further, regarding the coupling between the main body side of the virtual image display device 100 and the temple members 100C and 100D, the exterior case 7, the cover member 70, or the like on the main body side of the virtual image display device 100 can be regarded as a mounting member MT for mounting and fixing the respective parts such as the first display device 100A and the second display device 100B. In this case, the temple members 100C and 100D are members coupled to the mounting member MT on the lateral side, and it can be seen that the temple members 100C and 100D function as members for supporting the mounting member MT by being coupled to the mounting member MT. In addition to the first display device 100A and the second display device 100B, for example, acoustic equipment that emits sound in accordance with images displayed on the display devices 100A and 100B is mounted in the mounting member MT, that is, on the main body side of the virtual image display device 100. For example, as illustrated in FIG. 2, an opening portion OP for sound output of a speaker (not illustrated) incorporated in a side end portion of the mounting member MT is provided outside the hinge 74 at a coupling portion between the mounting member MT provided with the hinge 74 and each of the temple members 100C and 100D, which will be described in detail below.

Here, in the HMD 200 or the virtual image display device 100 according to the embodiment as described above, the temple members 100C and 100D are configured to include hollow members HLc and HLd in order to transmit sound generated from a speaker (not illustrated) on the main body side. That is, each of the hollow members HLc and HLd has a hollow structure, a laterally long hole is provided as a sound guide outlet GE at a position corresponding to the ear of the observer, for example, and thus sound from the main body side is transmitted to the ear of the observer via the hollow members HLc and HLd.

Figure 4:
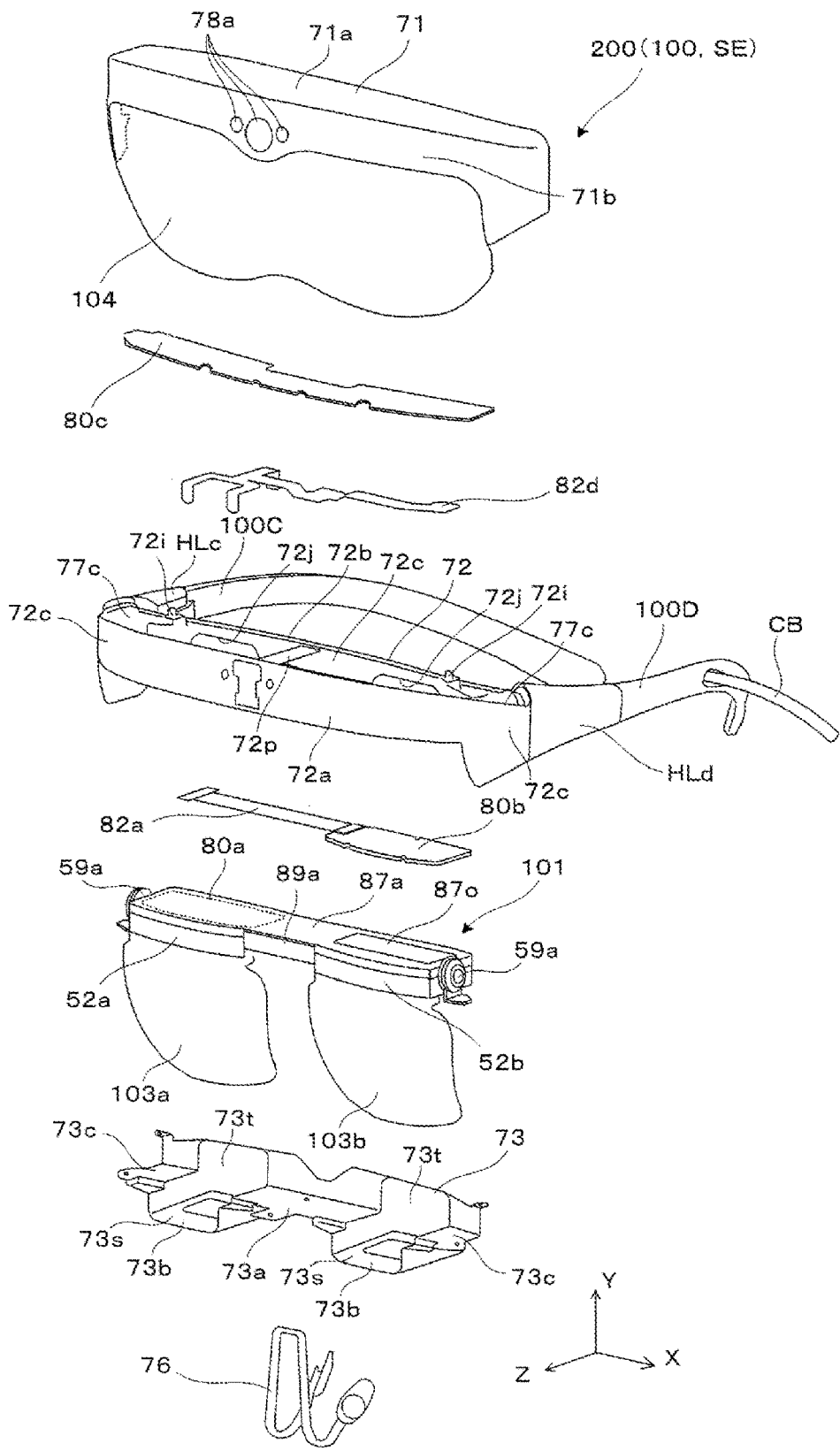
FIG. 4 is an exploded perspective view illustrating an internal structure of the virtual image display device.

FIG. 4 is an exploded perspective view of the HMD 200 or the virtual image display device 100. An optical device 101 which is an optical core part of image formation is inserted into the middle cover 72 from below and fixed to both ends of the middle cover 72 using bearing members 59a. In the optical device 101, the first metallic frame 52a and the second metallic frame 52b are coupled to each other, the upper side and the side surface thereof are covered with a shield member 87a, and a joint portion between the first metallic frame 52a and the second metallic frame 52b is also covered with the shield member 87a. The shield member 87a prevents electromagnetic interference. A first circuit member (circuit board) 80a is disposed between the first metallic frame 52a and the shield member 87a, and a second circuit member (circuit board) 80b is disposed between the second metallic frame 52b and the shield member 87a in a partially exposed state. In the optical device 101, the first and second circuit members 80a and 80b are sandwiched between the shield member 87a and the first and second metal frames 52a and 52b, and thus waterproofing of the first and second circuit members 80a and 80b can be enhanced. The first circuit member 80a and the second circuit member 80b are coupled to each other by a flexible printed circuit (FPC) member 82a to be electrically communicable with each other. The lower cover 73 is assembled to the lower side of the optical device 101. A nose pad member 76 is fixed to a central portion of the lower cover 73 from below. An accessory component circuit member (a circuit board) 80c is fixed to an upper portion of the middle cover 72 holding the optical device 101, and an FPC member 82d extending from the accessory component circuit member 80c is coupled to the second circuit member 80b, a camera device (not illustrated), acoustic equipment, or the like.

Figure 5:
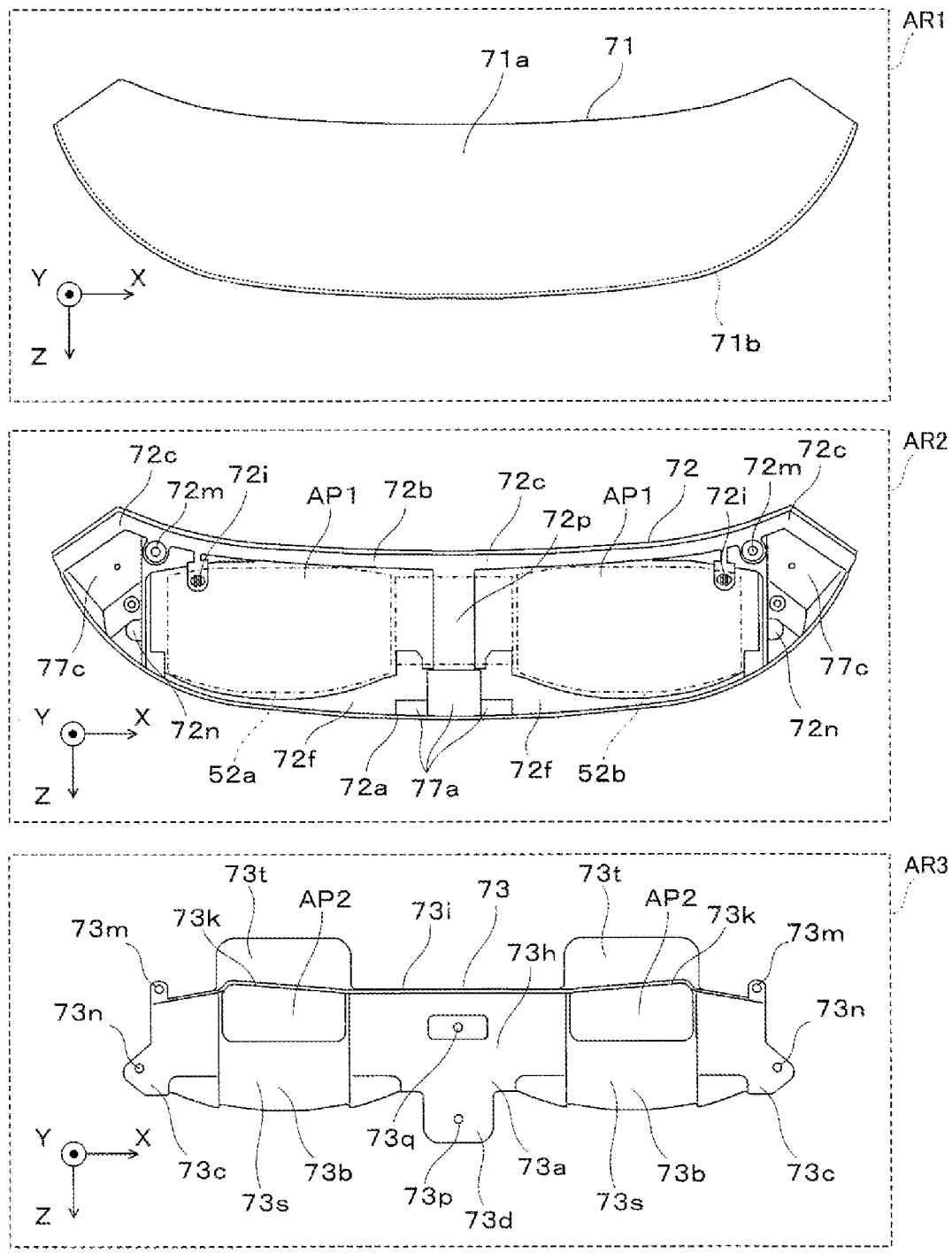
FIG. 5 is a plan view of a front cover, a plan view of a middle cover, and a plan view of a lower cover.

FIG. 5 is a plan view of components of the cover member 70 constituting the exterior. In FIG. 5, a region AR1 is a plan view of the front cover 71, a region AR2 is a plan view of the middle cover 72, and a region AR3 is a plan view of the lower cover 73. The front cover 71 is formed of a metal such as SUS, but may be formed of a resin material. The middle cover 72 is formed of a resin material, but may be formed of a metal. The lower cover 73 is formed of a metal such as SUS, but may be formed of a resin material.

Referring also to FIG. 4, the front cover 71 has a top plate 71a and a front plate 71b. The top plate 71a is wide in the forward and rearward direction at the center and gradually decreases in the forward and rearward width at both left and right ends. A vertical width of the front plate 71b increases at both left and right ends. At the center of the front plate 71b, there is formed an opening 78a for exposing accessory components such as a camera. The front cover 71 has a uniform thickness, and a contour of the front cover 71 in plan view is substantially the same as that of the middle cover 72.

Referring also to FIG. 4, the middle cover 72 has a front plate 72a, a rear frame 72b, a rear plate 72c, an end portion 72d, and a lower plate region 72f. The front plate 72a has a substantially uniform vertical width. At the center of the front plate 72a, a plurality of storage chambers 77a for storing accessory components such as a camera are provided to protrude from a back surface to the −Z side. The upper end side of the front plate 72a is in contact with or fitted to the front plate 71b of the front cover 71. The rear frame 72b is provided on the upper end side and is in contact with or fitted to a rear edge of the top plate 71a of the front cover 71. A pair of pin-like protrusions 72i formed at the rear frame 72b are for fixing the accessory component circuit member 80c illustrated in FIG. 4. The center of the front plate 72a and the center of the rear frame 72b are coupled by a bridge 72p. The rear plate 72c is provided to protrude downward, that is, to the −Y side from the rear frame 72b. The rear plate 72c has a notch 72j at two locations, and a vertical width thereof is reduced at the notch 72j. An end portion 72d is coupled to both ends of the front plate 72a, and is coupled to both ends of the rear frame 72b or the rear plate 72c. In particular, in the embodiment, a concave portion is formed in the end portion 72d as a space for accommodating speakers SKa and SKb (refer to FIG. 7) and the like, and the concave portion functions as an acoustic chamber 77c. A fastening portion 72m for coupling with the front cover 71 and the lower cover 73 and a fastening portion 72n for coupling with the lower cover 73 are provided at the end portion 72d. Further, the bearing member 59a of the optical device 101 is fixed to the lower surface side by the fastening portion 72n. The lower plate region 72f extends rearward, that is, to the −Z side, from a lower end of the central portion of the front plate 72a. Two openings AP1 are formed in the middle cover 72 in plan view, and the first metallic frame 52a and the second metallic frame 52b of the support structure 150 can be accommodated therein.

Referring also to FIG. 4, the lower cover 73 has a central portion 73a, a barrel accommodating portion 73b, and an end portion 73c. The central portion 73a has a bottom wall 73h and a rear wall 73i. A protruding region 73d is formed at the bottom wall 73h. The protruding region 73d and a side portion on the base side thereof are disposed to partially overlap the lower plate region 72f of the middle cover 72, and are in contact with or fitted to the lower plate region 72f. A fastening portion 73p for fixing the lower cover 73 to the lower plate region 72f of the middle cover 72 is provided at the protruding region 73d. A fastening portion 73q for fixing the nose pad member 76 and the joint 50c to the lower cover 73 is provided at a main body of the bottom wall 73h. The rear wall 73i is disposed near the outer side of the rear plate 72c of the middle cover 72, or is in contact with or fitted to the outer side of the rear plate 72c. A pair of barrel accommodating portions 73b are provided to sandwich the central portion 73a, and have a downward protruding portion 73s and a rearward protruding portion 73t. The barrel accommodating portion 73b is a portion that covers the barrel 41 of the first projection optical system 12a or the second projection optical system 12b, and has an opening AP2. The opening AP2 is provided corresponding to the emission port 410 of the barrel 41, and allows the image light to pass therethrough. An upper end 73k of the rearward protruding portion 73t is in contact with or fitted to the rear frame 72b of the middle cover 72. A fastening portion 73m for fixing the lower cover 73 to the top plate 71a of the front cover 71 or the like and a fastening portion 73n for fixing the lower cover 73 to the end portion 72d of the middle cover 72 or the like are provided at the end portion 73c.

Hereinafter, with reference to FIG. 6 and the like, among the details of the structure of the middle cover 72 in the above-described cover member 70, particularly, the coupling portion with the temple members 100C and 100D (refer to FIG. 2 and the like) will be described.

Figure 6:
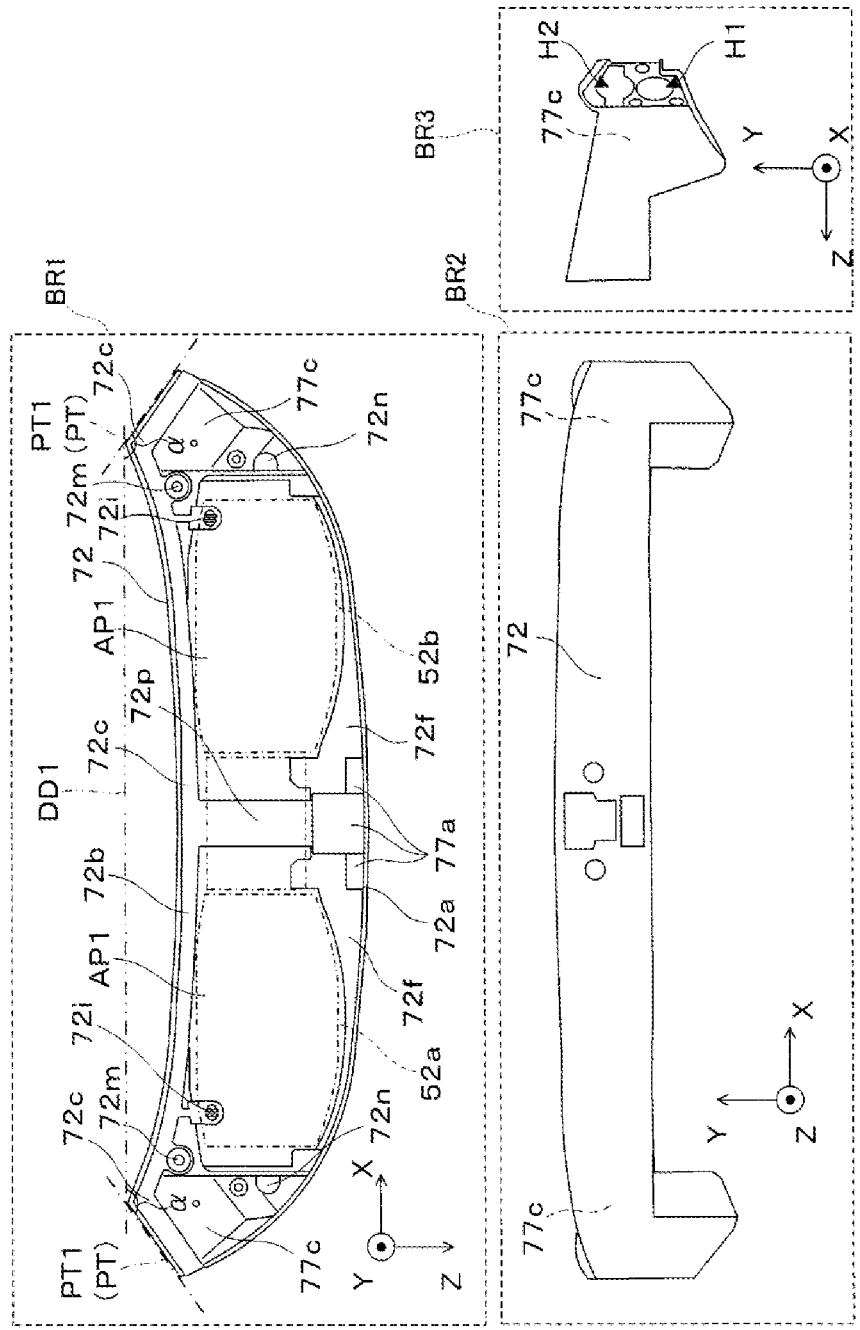
FIG. 6 is a plan view, a front view and a side view of the middle cover.
Figure 7:
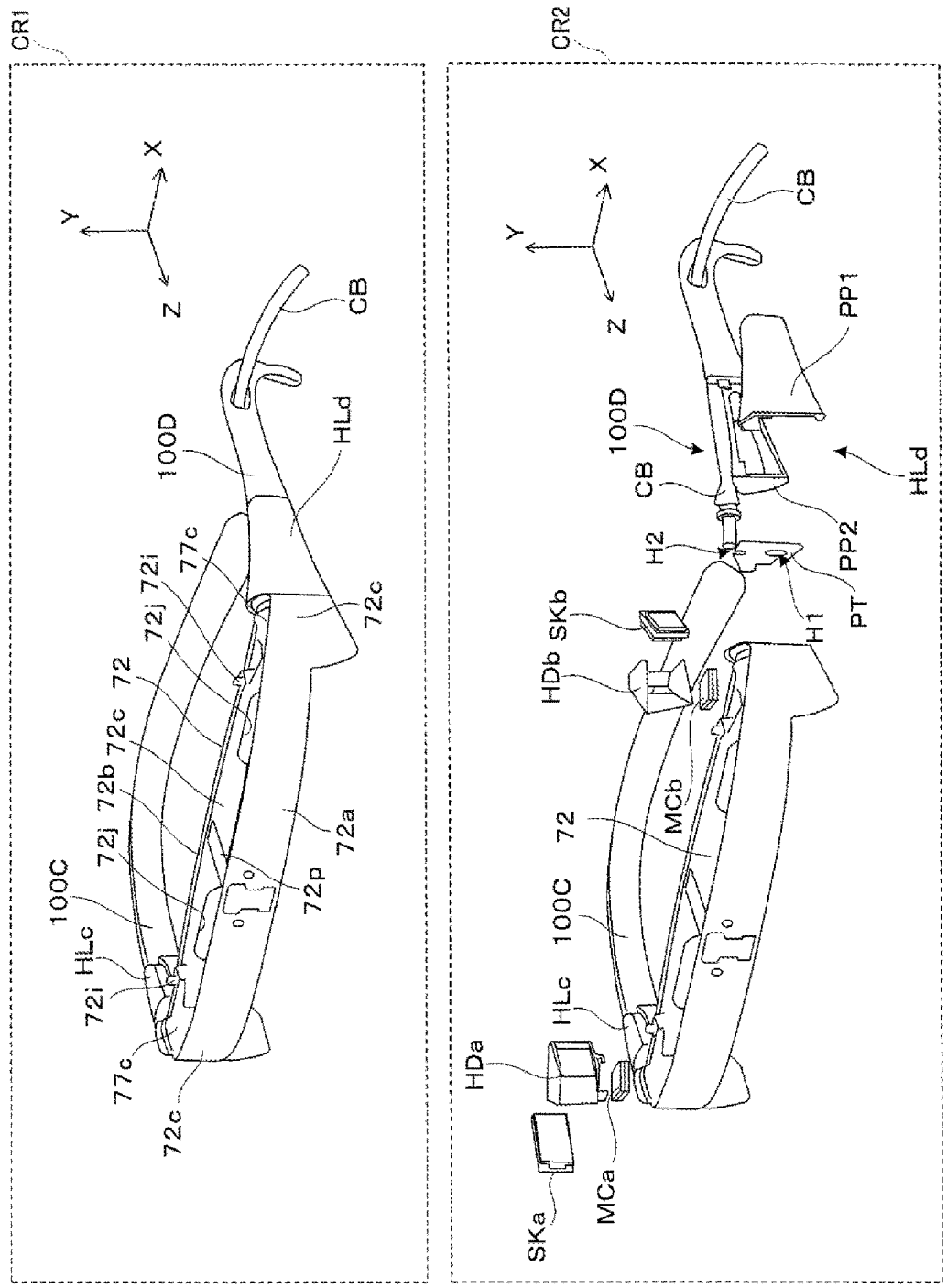
FIG. 7 is an exploded perspective view illustrating a structure of some of support members in the virtual image display device.
Figure 8:
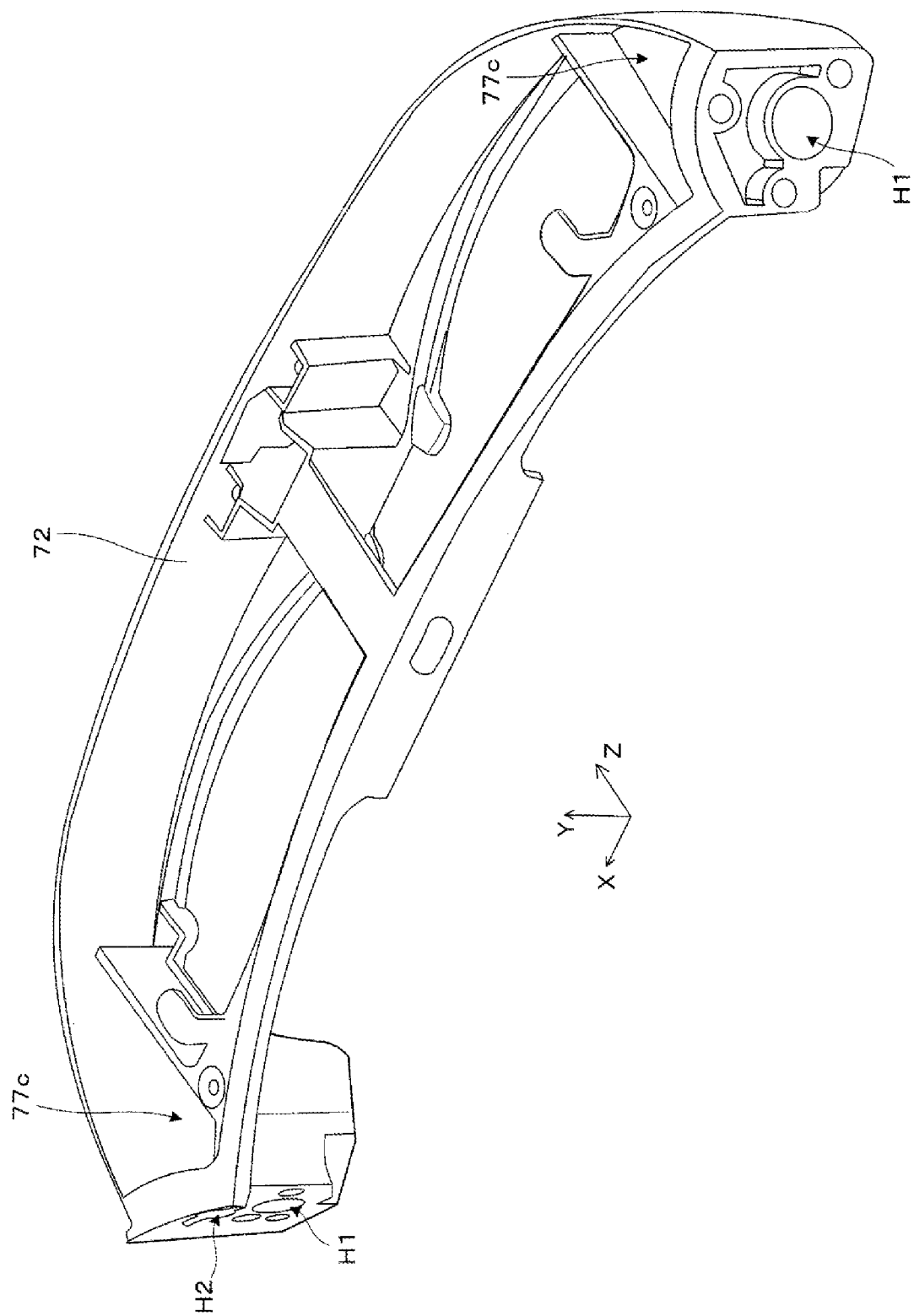
FIG. 8 is a perspective view of the middle cover.
Figure 9:
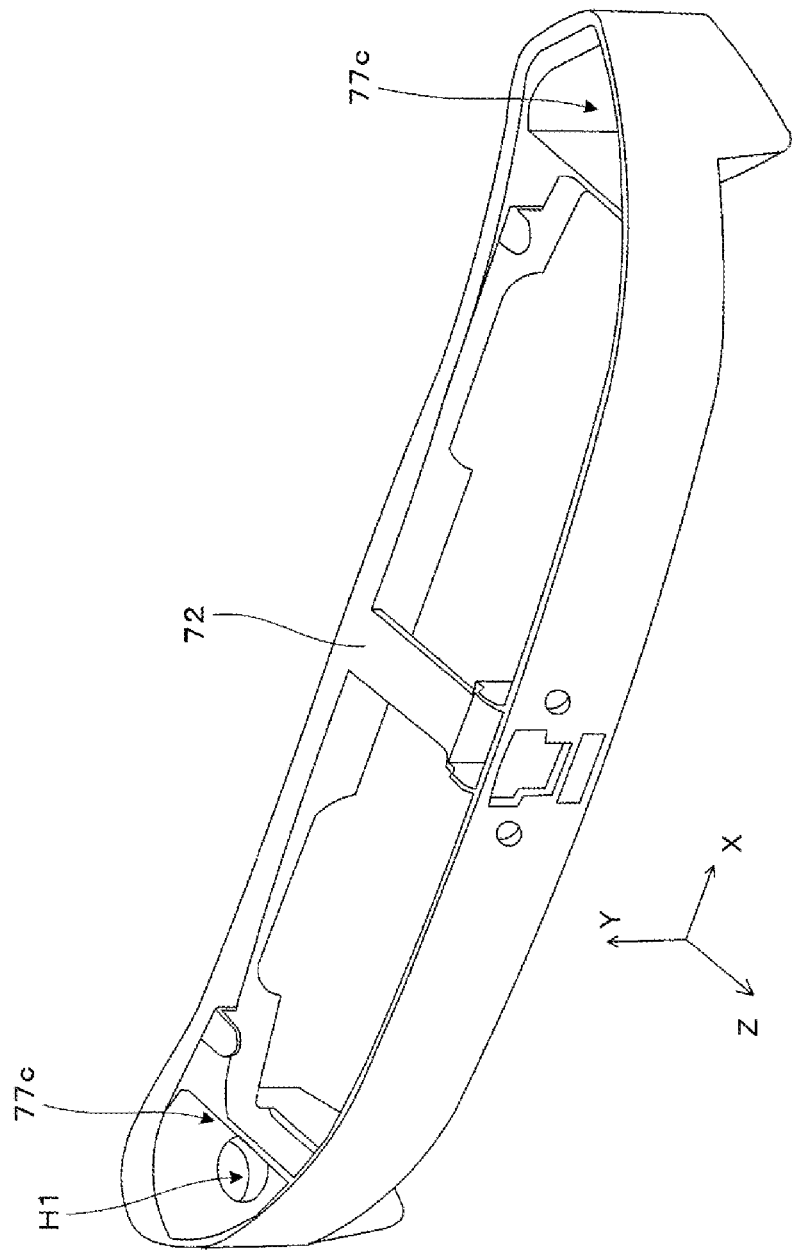
FIG. 9 is a perspective view of the middle cover seen from another angle.

In FIG. 6, a region BR1 is a plan view of the middle cover 72, and is equivalent to the plan view of the middle cover 72 in FIG. 5. In FIG. 6, a region BR2 is a front view of the middle cover 72, and a region BR3 is a side view of the middle cover 72. Further, in FIG. 7, a region CR1 is a perspective view of a portion including the middle cover 72 extracted from the exploded perspective view of the virtual image display device 100 illustrated in FIG. 4, and a region CR2 is an exploded perspective view of a portion extracted from the region CR1. Furthermore, FIG. 8 is a perspective view of the middle cover 72, and FIG. 9 is a perspective view of the middle cover 72 seen from another angle.

As illustrated in the drawing and as described above, the middle cover 72 is a portion of the cover member 70 serving as the mounting member MT (refer to FIG. 2 and the like) that is coupled to the temple members 100C and 100D. For this reason, as illustrated in FIGS. 6 to 9, equipment for sound, equipment for accommodating them, and equipment for transmitting sound are provided in the middle cover 72 and the periphery thereof, particularly on the end side in the ±X direction. Specifically, the acoustic chamber 77c is provided at both left and right (±X sides) ends of the middle cover 72, and speakers SKa and SKb and microphones MCa and MCb illustrated in the region CR2 of FIG. 7 are accommodated in the acoustic chamber 77c in a state in which they are assembled to holder members HDa and HDb.

Further, a plate-like member PT formed of a metal is provided on an end surface of the middle cover 72 coupled to the temple members 100C and 100D. A hole H1 is formed in the plate-like member PT in order to provide an output (sound output) opening portion OP for outputting sound emitted from the speakers SKa and SKb to the outside of the main body. In the example illustrated in FIG. 7, the temple member 100D side in the temple members 100C and 100D, which is the side through which a cable CB for various signal communications such as power supply and image information and audio information is inserted, is illustrated, and in this case, as illustrated in the region CR2 of FIG. 7 or the region BR3 of FIG. 6, in addition to the hole H1 for the opening portion OP, the plate-like member PT has a hole H2 for inserting the cable CB (or a notch or the like corresponding to a hole for inserting) above the hole H1. Due to the hole H2 being provided above the hole H1, it is possible to perform wiring of the cable CB while interference with the opening portion OP and the hinge 74 is reliably avoided. Further, in this case, an area necessary for guiding sound can be secured as the opening portion OP. In addition, regarding the above, in addition to the speakers SKa and SKb which are speaker main bodies (sound sources) and are constituted of a pair of left and right speakers, when the plate-like member PT provided with the opening portion OP is regarded as a speaker accessory, in other words, in a speaker in a broad sense in which a speaker includes not only the speaker SKa but also the plate-like member PT, and the like, the hole H2 for cable insertion in addition to the hole H1 for opening is provided in one of the pair of left and right members.

As illustrated in the region CR2 of FIG. 7, the hollow member HLd in the temple member 100D is configured to have a hollow portion between a plurality of components PP1 and PP2, for example, and thus a sound guide path SG for guiding sound is formed. More specifically, the component PP1 is a cover member that covers the entirety to form an exterior shape, and the component PP2 forms the sound guide path SG as an inner member incorporated in the component PP1. The hollow member HLd may be coated with a water repellent agent on the inner side (the inner surface side) of the sound guide path SG.

Although the configuration of the temple member 100D through which the cable CB is inserted has been described above, the other temple member 100C, that is, the configuration on the side (the right side; the −X side) which does not require insertion of the cable CB has the hole H1 for the opening portion OP and does not have the hole H2 for insertion as illustrated in, for example, FIG. 7, FIG. 8, or FIG. 9.

Figure 10:
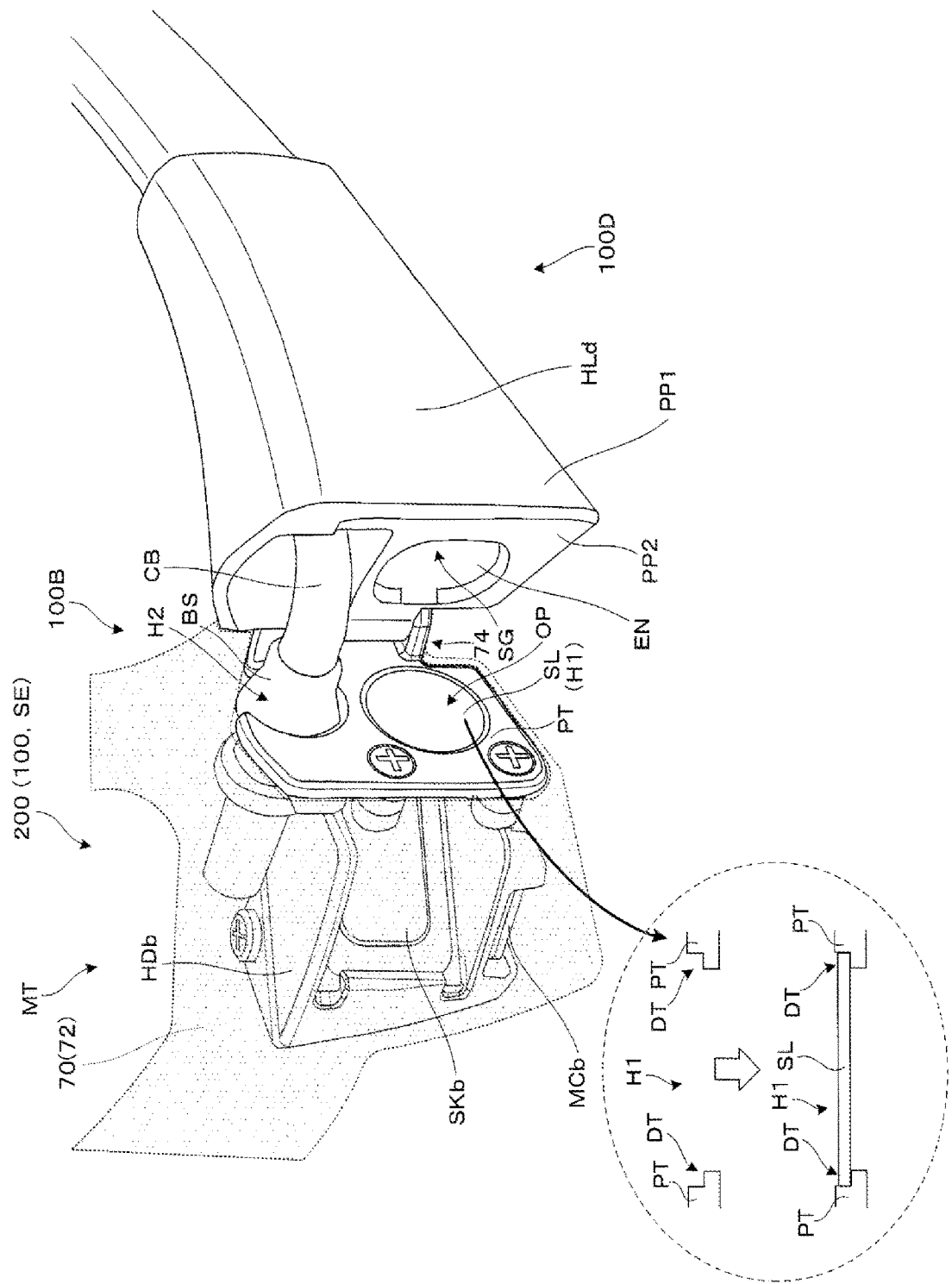
FIG. 10 is a partially enlarged view illustrating a hinge and a structure therearound.
Figure 11:
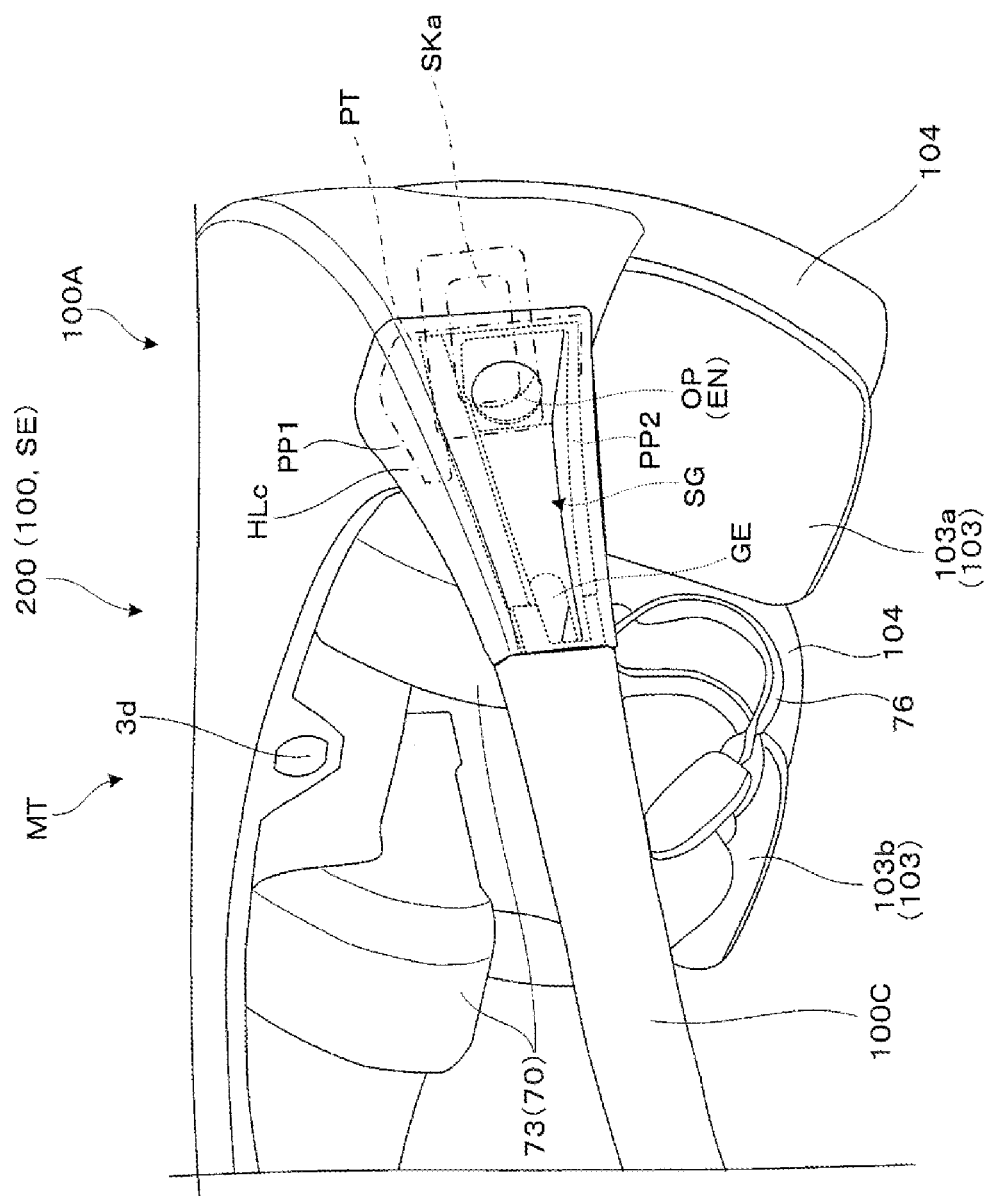
FIG. 11 is a partially enlarged view illustrating the structure of the hinge and the structure therearound from another angle.
Figure 12:
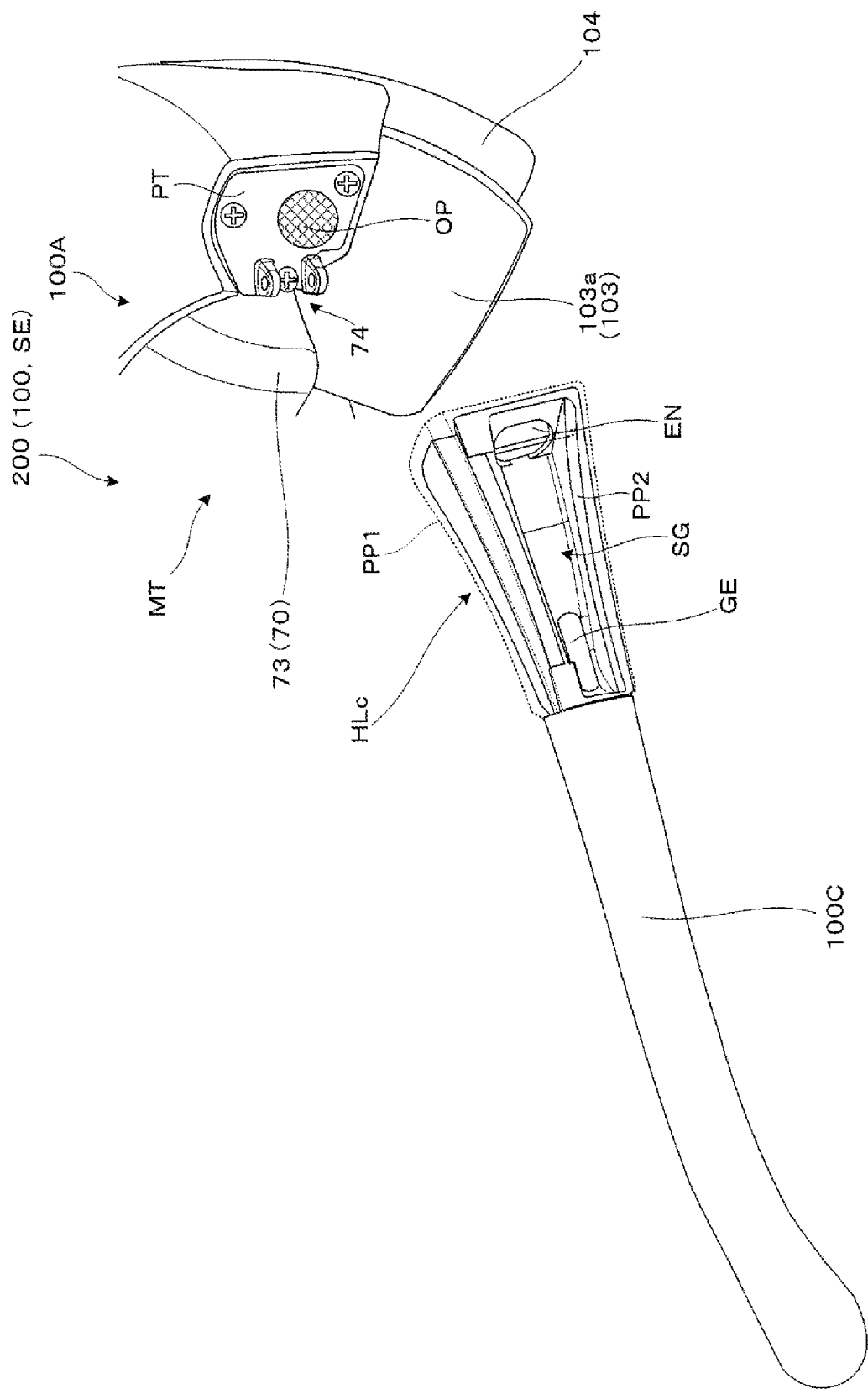
FIG. 12 is an exploded perspective view illustrating the hinge and the structure therearound.

Hereinafter, a configuration example of acoustic equipment such as a speaker will be described in more detail with reference to FIG. 10 and the like. FIG. 10 is a partially enlarged view illustrating the structure of the hinge 74 and the vicinity thereof, and FIG. 11 is a partially enlarged view illustrating the structure from another angle. Specifically, FIG. 10 illustrates an example of the configuration on the temple member 100D side (the left-ear side for the wearer) through which the cable CB is inserted, whereas FIG. 11 illustrates an example of the configuration on the temple member 100C side (the right-ear side for the wearer) through which the cable CB does not need to be inserted. Further, FIG. 12 is an exploded perspective view corresponding to the state of FIG. 11. As illustrated in FIG. 10, in the cable CB, a waterproof bushing BS is provided at a position corresponding to the hole H2 for insertion provided in the plate-like member PT.

First, in the example illustrated in FIG. 10, the speaker SKb and the microphone MCb are accommodated in the acoustic chamber 77c of the middle cover 72 in a state in which they are assembled to and integrated with the holder member HDb. In the drawing, a range accommodated on the middle cover 72 (or the acoustic chamber 77c) side is indicated by hatching.

In addition, in the illustrated example, the speaker SKb is fixed in a predetermined posture by the holder member HDb, and in particular, a surface of the rectangular plate-like speaker SKb is disposed to be inclined with respect to the plate-like member PT provided with the opening portion OP. In this case, it is possible to achieve a configuration in which a sound outlet portion on the main body side does not become larger than necessary while an output sound volume is ensured by maintaining a size of the speaker SKb at a certain level or more. In addition, the holder member HDb accommodates the microphone MCb together with the speaker SKb, but in the illustrated example, the microphone MCb is mounted to face downward, that is, in the –Z direction in a predetermined posture different from that of the speaker SKb so as to collect sound. In this case, the rectangular plate-like microphone MCb is disposed substantially perpendicular to the speaker SKb. Although not illustrated or described in detail, also on the opposite side (the right-ear side for the wearer), the speaker SKa and the microphone MCa are assembled to the holder member HDa (refer to FIG. 7) in the same configuration and are accommodated in the acoustic chamber 77c on the temple member 100C side (the right side; the –X side). For example, as illustrated by an alternate long and short dash line in FIG. 11, the speaker SKa is disposed to be inclined with respect to the plate-like member PT provided with the opening portion OP.

Next, regarding the opening portion OP provided in the plate-like member PT, various modes are assumed, but in the example shown in FIG. 10 and the like, a circular hole H1 is provided outside the hinge 74 in the plate-like member PT so that the opening portion OP is located outside the hinge 74 as described above, and the provided hole H1 is sealed with a cushioning member (for example, formed of a paper or cloth material) to form the opening portion OP. That is, the opening portion OP is formed by attaching a sealing member SL having a cushioning property to the hole H1 provided in the plate-like member PT. In order to ensure sealing, for example, as illustrated in a partially enlarged cross-sectional view in a range surrounded by a broken line in the drawing, first, as illustrated in an upper portion of the drawing, in the plate-like member PT, a stepped groove DT is formed in an edge portion of the circular hole H1 which is a mounting portion of the sealing member SL, that is, the plate-like member PT has the groove DT. Also, as shown in a lower portion of the drawing, sealing is performed by attaching the sealing member SL in the groove DT, and thus the opening portion OP has a structure capable of preventing or curbing entry of dust or the like into the middle cover 72 (or the acoustic chamber 77c) while sound (vibration) is transmitted. As for the sealing member SL, it is also conceivable to use, for example, waterproof cloth. That is, the sealing member SL as a waterproof cloth may be provided in the opening portion OP. Alternatively, it is also conceivable that the sealing member SL constituting the opening portion OP is constituted by a dustproof cloth or the like. More particularly, it is envisioned to use a waterproof and moisture permeable material such as a multi-layer fabric material such as Gore-Tex® (registered trademark). Thus, when the sealing is completely performed by a waterproof structure, there is a concern that the sealing is broken due to a change in atmospheric pressure or a difference in altitude, that is, the sealing member SL is broken, but such a situation can be avoided using the waterproof and moisture permeable material. Further, in this case, it can be said that the opening portion OP has a so-called release structure against a change in atmospheric pressure as the sealing member SL.

Further, it is also conceivable that the speakers SKa and SKb themselves are waterproof.

Further, when more emphasis is placed on the cushioning property of the cushioning member provided in the opening portion OP, for example, a material formed of urethane may be used.

Next, as described above and as illustrated in FIGS. 10 to 12, the hollow members HLc and HLd of the temple members 100C and 100D are hollow tubular members provided closest to the main body side, that is, the mounting member MT side in the temple members 100C and 100D, and the hollow portions form the sound guide path SG. It is conceivable that the hollow members HLc and HLd are formed of various materials, but may be formed of a hard resin, glass fiber or a metal, for example. By adopting these materials, it is possible to avoid or curb deterioration of sound quality due to mixing of noise sound (chatter sound) during transmission of sound. In FIGS. 11 and 12, an internal structure of the hollow member HLc is illustrated, and in FIG. 11, a component PP1 which is a cover member forming an external portion of the hollow member HLc is indicated by a solid line, and a component PP2 which is an internal member forming the internal sound guide path SG is indicated by a broken line. On the other hand, in FIG. 12, conversely, the component PP1 is indicated by a broken line, and the component PP2 forming the internal sound guide path SG is indicated by a solid line. As described above, since the hollow members HLc and HLd have a tubular configuration extending from the opening portion OP side toward the ear of the wearer, the sound output from the speakers SKa and SKb through the opening portion OP is transmitted toward the wearer.

For example, as illustrated in FIG. 10, an inlet of the sound guide path SG, that is, a sound guide inlet EN is spaced apart from the opening portion OP in a state in which the hinges 74 are rotated and the temple members 100C and 100D (the temple member 100D is illustrated in FIG. 10) are closed (or in a state in which they are almost closed). On the other hand, for example, as illustrated in FIG. 11, when the hinges 74 are rotated to open the temple members 100C and 100D (the temple member 100C is illustrated in FIG. 11), that is, when the virtual image display device 100 is in a mountable state, the sound guide inlet EN of the sound guide path SG comes into contact with the opening portion OP, and sound is efficiently transmitted in the sound guide path SG and is output from the sound guide outlet GE disposed near the ear of the wearer. The sound guide outlet GE is formed of a laterally long hole extending in the Z direction (a forward-rearward direction of the wearer). As a result, for example, even when there is a difference in a position of the ear of the wearer in the forward-rearward direction, it is possible to easily cope with the difference.

Figure 13:
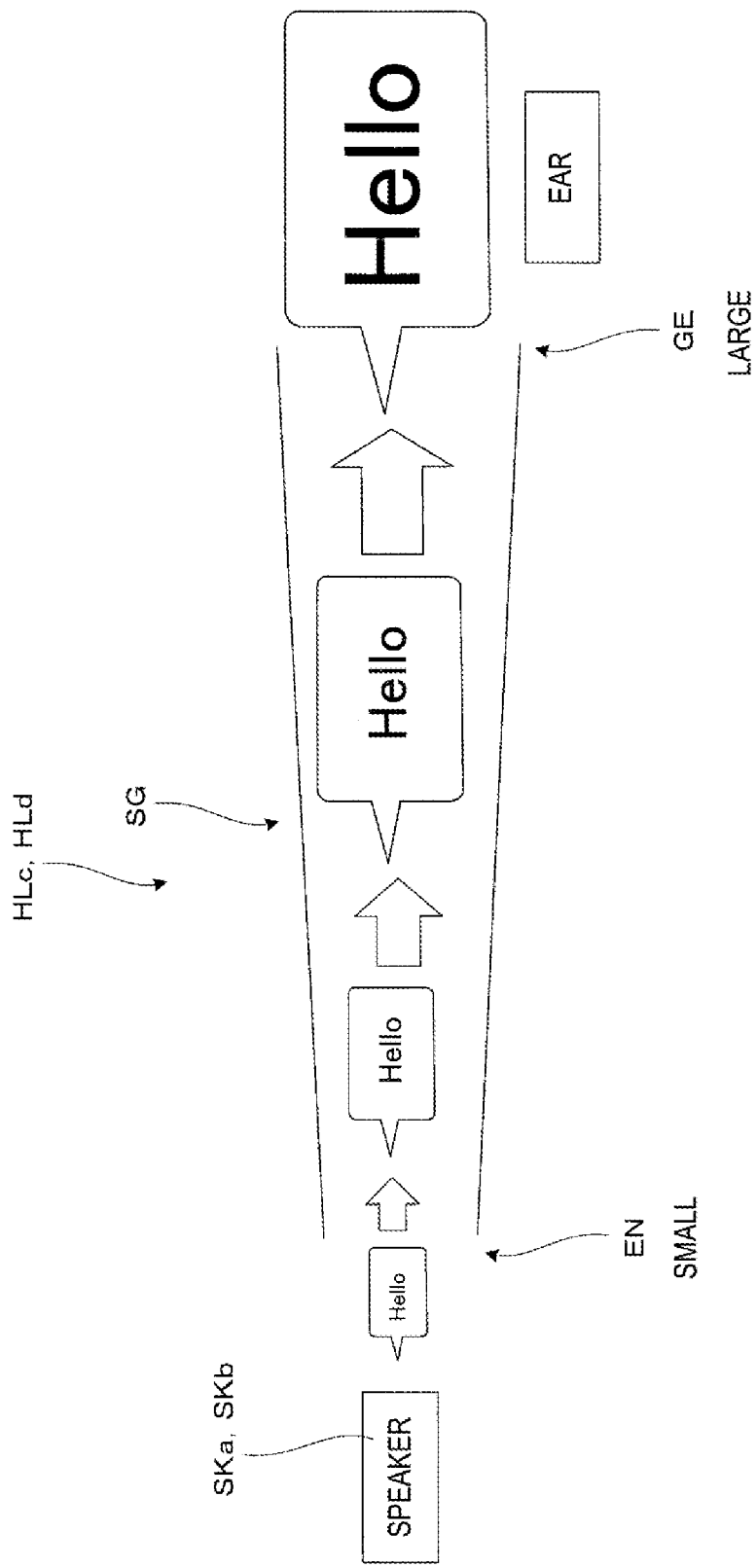
FIG. 13 is a conceptual diagram illustrating how sound is transmitted.

Here, regarding a shape of the sound guide path SG as described above, although it is conceivable to take various forms other than those illustrated in the drawings, for example, as conceptually illustrated in FIG. 13, a size on the speakers SKa and SKb side, that is, a size on the sound guide inlet EN side may be made relatively small, and a size on the side of the ear of the wearer, that is, a size on the side of the sound guide outlet GE may be made relatively large so that the sound volume is increased (amplified).

Further, in the above case, the shape of the sound guide path SG may be varied, that is, the configuration of the hollow members HLc and HLd may be varied. In this case, for example, positions and postures of the hollow members HLc and HLd may be made adjustable so that a position of the internal sound guide path SG, an angle of the sound guide outlet GE, and the like can be appropriately adjusted. In addition, in the temple members 100C and 100D (refer to FIG. 10 and the like), for example, the hollow members HLc and HLd may be configured to be replaceable. In addition, regarding the angle adjustment relating to sound guide, various aspects are assumed from the relationship with the entire structure or the like, and for example, the posture or the angle of the plate-like member PT or the opening portion OP provided in the plate-like member PT may be appropriately adjusted. Alternatively, when the optical device 101 is rotatable around a rotation axis extending parallel to the X-axis in order to adjust a position at which an image is seen, and the position or the angle (the posture) of the opening portion OP is changed accordingly, the posture of the temple members 100C and 100D or the hollow members HLc and HLd may be adjusted accordingly. For example, as indicated by an alternate long and short dash line in the region BR1 in FIG. 6, a portion (a surface) PT1 to which the plate-like member PT is to be provided forms an obtuse angle with respect to a direction DD1 (the ±X direction) in which the eyes of the wearer are arranged as indicated by two point chain line. That is, an angle α in the drawing is an obtuse angle. In such a state, adjustment can be made so that sound is reliably guided to the ear of the wearer.

Hereinafter, an example of a display operation in the display devices 100A and 100B will be described with reference to FIG. 14. Here, the first display device 100A will be described as a representative, and since the second display device 100B is the same, description thereof will be omitted.

Figure 14:
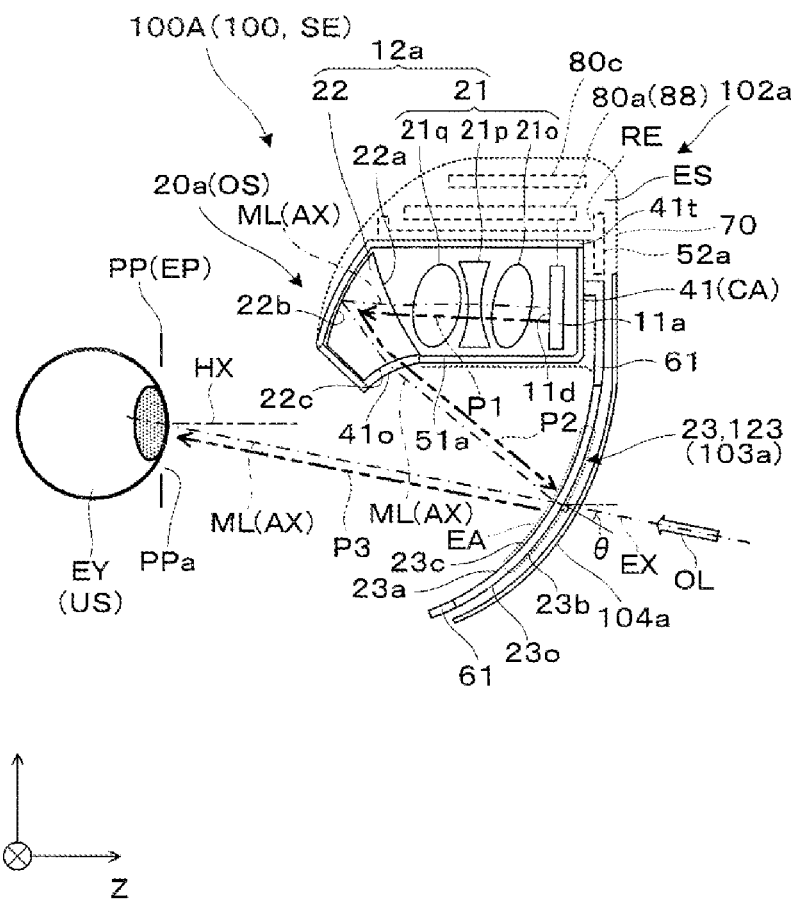
FIG. 14 is a side cross-sectional view for describing an optical internal structure of the display device.

FIG. 14 is a side cross-sectional view for describing an optical structure of the first display device 100A. The first display device 100A includes a first display element 11a, a first display unit 20a, and a first circuit member 80a. The first display element 11a is an image light generating device. The first display unit 20a is an imaging optical system that forms a virtual image, and includes a projection lens 21, a prism mirror 22, and a see-through mirror 23 in an integrated state. In the first display unit 20a, the projection lens 21 and the prism mirror 22 function as a first projection optical system 12a on which image light ML from the first display element 11a is incident, and the see-through mirror 23 functions as a partially transmissive mirror 123 that partially reflects the image light ML emitted from the first projection optical system 12a toward a pupil position PP or an eye EY. The projection lens 21 and the prism mirror 22 constituting the first projection optical system 12a correspond to a first optical member and a second optical member on which the video light or the image light ML is incident, respectively. Further, the first display element 11a, the projection lens 21, and the prism mirror 22 are optical elements that constitute the first display driving unit 102a illustrated in FIG. 1, and the see-through mirror 23 corresponds to the first combiner 103a illustrated in FIG. 1. The see-through mirror 23 has an exterior that is convex outward. The projection lens 21 and the prism mirror 22 constituting the first projection optical system 12a are fixed in the barrel 41 in a mutually aligned state together with the first display element 11a. The barrel 41 is an optical case CA in which the first projection optical system 12a is accommodated in a positioned state.

The barrel 41 or the optical case CA that accommodates the optical elements constituting the projection lens 21 and the like is supported by a first metallic frame 52a and is disposed below the first metallic frame 52a. The first metallic frame 52a is covered by the cover member 70, and the barrel 41 is also entirely covered by the cover member 70. The first metallic frame 52a is formed of a metallic material. The barrel 41 and the cover member 70 are formed of a light-shielding resin material, and one surface of the prism mirror 22 is exposed at an emission port 410 of the barrel 41. The barrel 41 is in contact with the first metallic frame 52a so that an upper portion 41t is fitted thereto, and is fixed in a state in which it is suspended from the first metallic frame 52a. As a result, the first display unit 20a is fixed in a state in which it is suspended from the first metallic frame 52a by the upper portion 41t of the barrel 41 being brought into contact with and screwed to the first metallic frame 52a so as to be fitted thereto. The first metallic frame 52a has a recess RE for arranging the first circuit member 80a on an upper side thereof. The cover member 70 has an internal space ES of which a sealing property is enhanced by being combined with the barrel 41 or the like, and an accessory component circuit member 80c is accommodated above the first circuit member 80a in the internal space ES.

In the first display device 100A, the first display element 11a is a spontaneous light emission type image light generation device. The first display element 11a emits the image light ML to the first projection optical system 12a. The barrel 41 accommodates and supports the first display element 11a together with optical elements such as the projection lens 21. The first display element 11a is, for example, an organic electroluminescence (EL) display, and forms a color still image or moving image on a two-dimensional display surface 11d. The first display element 11a is driven by the first circuit member 80a, specifically a display control device 88, to perform a display operation. The first display element 11a is not limited to the organic EL display, and can be replaced with a display device using inorganic EL, an organic LED, an LED array, a laser array, a quantum dot light emission element, or the like. The first display element 11a is not limited to the spontaneous light emission type image light generation device, and may include an LCD and another light modulation element, and may form an image by illuminating the light modulation element with a light source such as a backlight. As the first display element 11a, a liquid crystal on silicon (LCOS) (LCoS is a registered trademark), a digital micro-mirror device, or the like may be used instead of an LCD.

In the present embodiment, the first display unit 20a includes two reflection surfaces, and an optical path is bent by the see-through mirror 23 and the prism mirror 22. The first display unit 20a is an off-axis optical system OS. The projection lens 21, the prism mirror 22, and the see-through mirror 23 are disposed to be non-axially symmetrical and have an optical surface that is non-axisymmetric. In the first display unit 20a, the optical elements 21, 22, and 23 are arranged along an off-axis plane by bending an optical axis AX within an off-axis plane (that is, a reference plane) parallel to an YZ plane. In other words, in the off-axis plane (the reference plane) parallel to the YZ plane, an optical path portion P1 from the projection lens 21 to an inner reflection surface 22b, an optical path portion P2 from the inner reflection surface 22b to the see-through mirror 23, and an optical path portion P3 from the see-through mirror 23 to the pupil position PP are bent in a Z shape in two stages. As a result, a normal line at a central portion in which the optical axis AX in the see-through mirror 23 intersects forms an angle of about $\theta=40$ to $50°$ with respect to the Z direction. In the first display unit 20a, the optical elements 21, 22, and 23 constituting the first display device 100A are arranged so that height positions thereof change in a longitudinal direction, and an increase in a transverse width of the first display device 100A can be prevented. Further, since the optical path portions P1 to P3 are disposed to be folded in two stages in a Z shape by folding of the optical path due to reflection by the prism mirror 22 or the like, and since the optical path portions P1 and P3 are relatively close to horizontal, it is possible to reduce a size of the first display unit 20a also in the vertical direction and the forward and rearward direction. In addition, since an inclination angle $\theta$ of the central portion of the see-through mirror 23 is $40°$ to $50°$, when an inclination of the optical path portion P3 corresponding to the line of sight is constant, the inclination of the optical path portion P2 with respect to the Z-axis is $70°$ to $90°$, and a thickness of the virtual image display device 100 in the Z direction can be easily reduced.

In the first display unit 20a, the optical path portion P1 from the projection lens 21 to the inner reflection surface 22b extends rearward in a slightly obliquely upward direction or a direction substantially parallel to the Z direction with respect to the viewpoint. The optical path portion P2 from the inner reflection surface 22b to the see-through mirror 23 extends forward in an obliquely downward direction. When a horizontal plane direction (an XZ plane) is used as a reference, the inclination of the optical path portion P2 is larger than the inclination of the optical path portion P1. The optical path portion P3 from the see-through mirror 23 to the pupil position PP extends rearward in a slightly obliquely upward direction or in a direction substantially parallel to the Z direction. In the illustrated example, a portion of the optical axis AX corresponding to the optical path portion P3 is about $-10°$ in the $+Z$ direction with a downward direction being negative. That is, the partially transmissive mirror 123 reflects the image light ML so that the optical axis AX or the optical path portion P3 is directed upward by a predetermined angle, that is, upward by about $10°$. As a result, an emission optical axis EX which is an extension of a portion of the optical axis AX corresponding to the optical path portion P3 extends obliquely downward by about $10°$ with respect to a central axis HX parallel to the forward $+Z$ direction. This is because the line of sight of a human being is stable in a slightly lowered eye state in which the line of sight is inclined downward by approximately $10°$ with respect to a horizontal direction. The central axis HX that extends in the horizontal direction with respect to the pupil position PP assumes a case in which the wearer US wearing the first display device 100A relaxes in an upright posture and faces the front and gazes in the horizontal direction or in a horizontal line.

In the first display unit 20a, the projection lens 21 includes a first lens 21o, a second lens 21p, and a third lens 21q. The projection lens 21 receives the image light ML emitted from the first display element 11a and causes it to be incident on the prism mirror 22. The projection lens 21 focuses the image light ML emitted from the first display element 11a into a state close to a parallel luminous flux. Optical surfaces of the first lens 21o, the second lens 21p, and the third lens 21q constituting the projection lens 21, that is, an incident surfaces and the emission surface are free curved surfaces or aspherical surfaces, have asymmetry with respect to the longitudinal direction parallel to the YZ plane and intersecting the optical axis AX with the optical axis AX interposed therebetween, and have symmetry with respect to the transverse direction or the X direction with the optical axis AX interposed therebetween. The first lens 21o, the second lens 21p, and the third lens 21q are formed of a resin, for example, but can also be formed of glass. An antireflection film can be formed at the optical surfaces of the first lens 21o, the second lens 21p, and the third lens 21q constituting the projection lens 21.

The prism mirror 22 is an optical member having a refracting and reflecting function that combines the functions of a mirror and a lens, and refracts and reflects the image light ML from the projection lens 21. The prism mirror 22 has an incident surface 22a corresponding to an incident portion, an inner reflection surface 22b as a reflection surface corresponding to an reflection portion, and an emission surface 22c corresponding to an emission portion. The prism mirror 22 emits the image light ML incident from the front so that it is bent in a direction inclined downward with respect to a direction in which an incident direction is reversed (a direction of the light source seen from the prism mirror 22). The incident surface 22a, the inner reflection surface 22b, and the emission surface 22c which are the optical surfaces constituting the prism mirror 22 have asymmetry with respect to the longitudinal direction parallel to the YZ plane and intersecting the optical axis AX with the optical axis AX interposed therebetween, and have symmetry with respect to the transverse direction or the X direction with the optical axis AX interposed therebetween. The optical surfaces of the prism mirror 22, that is, the incident surface 22a, the inner reflection surface 22b, and the emission surface 22c are, for example, free curved surfaces. The incident surface 22a, the inner reflection surface 22b, and the emission surface 22c are not limited to free curved surfaces, and may be aspherical surfaces. The prism mirror 22 may be formed of, for example, a resin, but may also be formed of glass. The inner reflection surface 22b is not limited to one that reflects the image light ML by total reflection, and may be a reflection surface formed of a metal film or a dielectric multilayer film. In this case, a reflection film formed of a single layer film or multilayer film formed of a metal such as Al or Ag is formed at the inner reflection surface 22b by vapor deposition or the like, or a sheet-like reflection film formed of a metal is affixed thereto. Although detailed illustration is omitted, an antireflection film can be formed at the incident surface 22a and the emission surface 22c.

The see-through mirror 23, that is, the first combiner 103a, is a curved plate-like reflecting optical member that functions as a concave surface mirror, reflects the image light ML from the prism mirror 22, and partially transmits external light OL. The see-through mirror 23 reflects the image light ML from the prism mirror 22 disposed in an emission region of the first projection optical system 12a toward the pupil position PP. The see-through mirror 23 has a reflection surface 23c and an outer surface 23o.

The see-through mirror 23 partially reflects the image light ML and enlarges an intermediate image formed at the light emission side of the emission surface 22c of the prism mirror 22. The see-through mirror 23 is a concave mirror that covers the pupil position PP at which the eye EY or the pupil is disposed, has a concave shape toward the pupil position PP, and has a convex shape toward the outside. The pupil position PP or an opening PPa thereof is referred to as eye point or eye box. The pupil position PP or the opening PPa corresponds to an emission pupil EP on the emission side of the first display unit 20a. The see-through mirror 23 is a collimator and converges main rays of the image light ML temporarily spread by imaging in the vicinity of the emission side of the prism mirror 22 of the first projection optical system 12a, which are the main rays of the image light ML emitted from each of points on the display surface 11d, to the pupil position PP. As a concave mirror, the see-through mirror 23 enables an intermediate image (not illustrated) formed at the first display element 11a, which is an image light generation device, and re-imaged by the first projection optical system 12a to be seen in an enlarged manner. More specifically, the see-through mirror 23 functions in the same manner as a field lens, and causes the image light ML from each of the points of the intermediate image (not illustrated) formed behind the emission surface 22c of the prism mirror 22 to be incident on the pupil position PP in a collimated state so as to be collected as a whole. The see-through mirror 23 needs to have a spread equal to or larger than the effective region EA corresponding to an angle of view (the sum of viewing angles in the vertical and horizontal directions with respect to the optical axis AX extending in the forward direction of the eye), from the viewpoint that it is disposed between the intermediate image and the pupil position PP. In the see-through mirror 23, an outer region extending to the outside of the effective region EA does not directly affect the imaging and thus can have an arbitrary surface shape, but from the viewpoint of ensuring an exterior like a spectacle lens, it is desirable that a curvature of the outer region be the same as a curvature of a surface shape of an outer edge of the effective region EA, or the curvature of the outer region continuously change from the outer edge.

The see-through mirror 23 is a transflective mirror plate having a structure in which a transmissive reflection film 23a is formed at a rear surface of a plate-like body 23b. The reflection surface 23c of the see-through mirror 23 has asymmetry with respect to the longitudinal direction parallel to the YZ plane and intersecting the optical axis AX with the optical axis AX interposed therebetween, and has symmetry with respect to the transverse direction or the X direction with the optical axis AX interposed therebetween. The reflection surface 23c of the see-through mirror 23 is, for example, a free curved surface. The reflection surface 23c is not limited to a free curved surface, and may be an aspherical surface. The reflection surface 23c needs to have a spread equal to or larger than the effective region EA. When the reflection surface 23c is formed in the outer region wider than the effective region EA, a difference in visibility is less likely to occur between an external image from behind the effective region EA and an external image from behind the outer region.

The reflection surface 23c of the see-through mirror 23 transmits some of light when the image light ML is reflected. Thus, because the external light OL passes through the see-through mirror 23, see-through view of the outside is enabled, and a virtual image can be superimposed on an external image. At this time, when the plate-like body 23b has a thickness of less than or equal to approximately a few millimeters, a change in magnification of the external image can be curbed to be small. A reflectance of the reflection surface 23c with respect to the image light ML and the external light OL is set to 10% or more and 50% or less in a range of an incident angle (corresponding to the effective region EA) of the assumed image light ML from the viewpoint of ensuring a brightness of the image light ML and facilitating observation of the external image by see-through. The plate-like body 23b which is a base material of the see-through mirror 23 is formed of, for example, a resin, and may also be formed of glass. The plate-shaped body 23b is formed of the same material as the support plate 61 that supports the plate-shaped body 23b from the surrounding thereof, and has the same thickness as the support plate 61. The transmissive reflection film 23a is formed of, for example, a dielectric multilayer film configured of a plurality of dielectric layers of which a film thickness has been adjusted. The transmissive reflection film 23a may be a single-layer film or a multilayer film of a metal such as Al or Ag of which a film thickness has been adjusted. The transmissive reflection film 23a may be formed by laminating using deposition, for example, and may also be formed by affixing a sheet-like reflection film. An antireflection film is formed at an outer surface 23o of the plate-like body 23b.

A light transmission cover 104a is disposed in front of the see-through mirror 23. The light transmission cover 104a is a thin plate-like member having high light transmittance, and an upper end thereof is supported by the cover member 70, specifically, the front cover 71 illustrated in FIG. 2 and the like. The light transmission cover 104a has a convex shape toward the outside and has a uniform thickness. The light transmission cover 104a does not affect the imaging of the image light ML, and a curvature thereof can be arbitrarily set within a range in which it does not interfere with the see-through mirror 23. The light transmission cover 104a is as thin as about several millimeters or less and hardly affects observation of an external image. The light transmission cover 104a is formed of, for example, a resin, and an antireflection film or a hard coating layer may be formed thereon.

In describing the optical path, the image light ML from the first display element 11a is incident on the projection lens 21 and is emitted from the projection lens 21 in a substantially collimated state. The image light ML that has passed through the projection lens 21 is incident on the prism mirror 22, passes through the incident surface 22a while being refracted by it, is reflected by the inner reflection surface 22b with a high reflectance close to 100%, and is refracted again by the emission surface 22c. The image light ML from the prism mirror 22 once forms an intermediate image, is then incident on the see-through mirror 23 and is reflected by the reflection surface 23c with a reflectance of about 50% or less. The image light ML reflected by the see-through mirror 23 is incident on the pupil position PP at which the eye EY or pupil of the wearer US is placed. The external light OL that has passed through the light transmission cover 104a and has passed through the see-through mirror 23 and the support plate 61 therearound is also incident on the pupil position PP. In other words, the wearer US wearing the first display device 100A can observe a virtual image of the image light ML in a state in which it overlaps the external image.

The first circuit member 80a illustrated in FIG. 14 includes the display control device 88. The display control device 88 is a display control circuit, outputs a drive signal corresponding to an image to the first display elements 11a and the like, and controls display operations of the first display elements 11a and the like. The display control device 88 includes, for example, an IF circuit, a signal processing circuit, and the like, and causes a two-dimensional image display to be performed on the first display element 11a and the like according to image data or an image signal received from the outside. The display control device 88 may include a main substrate that controls the first display device 100A and the second display device 100B. The main substrate may have an interface function that communicates with the user terminal 90 illustrated in FIG. 1 and performs signal conversion on a signal received from the user terminal 90, and an integration function that links the display operation of the first display device 100A and the display operation of the second display device 100B. The HMD 200 or the virtual image display device 100 that does not include the first circuit member 80a or a portion thereof, or the user terminal 90 is also a virtual image display device.

The accessory component circuit member 80c illustrated in FIG. 14 is operated under the control of the display control device 88, and operates a camera 3a, an illuminance sensor 3b, and a proximity sensor 3c that are the accessory components illustrated in FIG. 3 and the like, and operates a proximity sensor 3d and the like illustrated in FIG. 2. Specifically, the accessory component circuit member 80c captures an image of the front of the HMD 200 by the camera 3a, for example, and acquires a front image. In addition, the accessory component circuit member 80c detects brightness of the surrounding environment of the HMD 200 by the illuminance sensor 3b, and outputs it to the display control device 88 as information for controlling a display brightness, for example. The accessory component circuit member 80c detects an object approaching the HMD 200 from the front by the proximity sensor 3c, detects an object (specifically, a wearer) approaching the HMD 200 from the rear by the proximity sensor 3d, and outputs them to the display control device 88.

As described above, in the first display device 100A, it is possible to perform image display having a wide angle of view with high accuracy.

In the above description, for example, the accessory component circuit member 80c may be a circuit board for operating, for example, the camera 3a or the like, and in addition, may be a circuit board for operating the speakers SKa and SKb and the microphones MCa and MCb.

In addition, for example, in the virtual image display device 100, when the display operation by the first display device 100A or the like as described above is not performed and only the sound output by the speakers SKa and SKb is performed, the virtual image display device 100 may be regarded as an acoustic device SE.

In addition, for example, as illustrated in FIG. 1 and the like, weights WG serving as balancers are provided on tip end sides (the sides farthest from the mounting member MT) of the temple members 100C and 100D. In the embodiment, as described above, since the structure for transmitting sound provided in the temple members 100C and 100D can be made simple and lightweight, it is possible to accurately adjust a position of the center of gravity of the virtual image display device 100 using the weights WG.

As described above, the virtual image display device 100 according to the embodiment includes the display element 11a (the first display device 100A including the display element 11a), the mounting member MT that fixes the display element 11a, the temple members 100C and 100D coupled to the mounting member MT, and the speakers SKa and SKb mounted on the mounting member MT, and the speakers SKa and SKb have the opening portions OP for sound output at the coupling portions between the mounting member MT and the temple members 100C and 100D. In the virtual image display device 100, since the speakers SKa and SKb are mounted on the mounting member MT constituting the main body side of the device, for example, wiring for sound transmission on the temple members 100C and 100D side is not required, and the configuration relating to sound in the temple members 100C and 100D and the periphery thereof can be simplified, and also since the opening portions OP for sound output of the speakers SKa and SKb are provided at the coupling portions between the mounting member MT and the temple members 100C and 100D, a state in which the sound of the speakers SKa and SKb can be reliably transmitted to the observer's ears can be maintained.

For example, unlike the above-described aspect, when the acoustic device is disposed near the ear, the difficulty of the waterproof structure may increase, and a thickness of the temple portion may increase, compared to the above-described aspect. In addition, in such a case, the flexibility of the temple portion cannot be used or becomes difficult to use, which may affect the mounting property. On the other hand, in the embodiment, as described above, it is possible to improve the waterproof property, to reduce the size, to save the power consumption, and the like while the simple configuration is maintained.

MODIFIED EXAMPLES AND OTHERS

Although the present disclosure has been described with reference to the above embodiments, the present disclosure is not limited to the above embodiments and can be implemented in various modes without departing from the spirit of the disclosure. For example, the following modifications are possible.

In the above description, although the present disclosure is applied to the virtual image display device (the image display device) including the first display device 100A and the like, the present disclosure is not limited thereto and may also be applied to a device that does not include video display but transmits sound, that is, an acoustic device that provides sound.

Also, although the HMD 200 includes the first display device 100A and the second display device 100B in the above description, the HMD 200 or the virtual image display device 100 may be configured so that a single first display device 100A or second display device 100B is supported in front of the eyes by the temple members 100C and 100D.

The first metallic frame 52a and the second metallic frame 52b are not limited to a magnesium alloy, and can be formed of an aluminum alloy or other metals.

The lower case does not need to be divided into the middle frame 72 and the lower cover 73, and they can be formed as one component.

Components such as the camera 3a, the illuminance sensor 3b, the proximity sensor 3c, and the speaker can be omitted as appropriate according to the application. A waterproof structure may be provided around the speaker.

A virtual image display device according to a specific aspect includes a display element, a mounting member that fixes the display element, a temple member that is coupled to the mounting member, and a speaker that is mounted on the mounting member, and the speaker has an opening portion for sound output at a coupling portion between the mounting member and the temple member.

In the virtual image display device, wiring for sound transmission on the temple member side becomes unnecessary, and the configuration relating to sound in the temple member and the periphery thereof can be simplified by mounting the speaker on the mounting member constituting the main body side of the device, for example, and also, it is possible to maintain a state in which the sound of the speaker can be reliably transmitted to the ears of the observer by providing an opening portion for outputting the sound of the speaker at the coupling portion between the mounting member and the temple member.

In a particular aspect, the temple member includes a hollow member that guides sound output from the opening portion of the speaker. In this case, by providing the hollow structure in the temple member, it is possible to increase a degree of freedom in design or the like when the sound output from the opening portion of the speaker is guided to the ears of the observer.

In a specific aspect, a hinge provided at the coupling portion and configured to rotates is further included, and in the temple member, a sound guide inlet of the hollow member comes into contact with the opening portion in a state in which the temple member is opened by rotating the hinge. In this case, the sound is efficiently transmitted.

In a specific aspect, the hollow member is formed of a hard resin, glass fiber, or a metal. In this case, it is possible to avoid or curb deterioration in sound quality due to mixing of noise sound during transmission of sound.

In a specific aspect, the sound guide outlet of the hollow member is a laterally long hole. In this case, transmission to the ear can be performed more reliably.

In a specific aspect, a position of the sound guide outlet of the hollow member is adjustable. In this case, sound transmission can be favorably maintained in accordance with individual differences.

In a specific aspect, the hollow member is coated with a water repellent agent on the inner side of the sound guide path. In this case, water resistance can be improved while simplification and weight reduction of the device are maintained.

In a specific aspect, a plate-like member forming the coupling portion is provided, and the opening portion is formed by attaching a cushioning sealing member to a hole provided in the plate-like member. In this case, it is possible to maintain good sound transmission while dust resistance and water resistance are provided by the seal.

In a specific aspect, the plate-like member has a stepped groove at a position at which the sealing member is attached. In this case, the attachment of the sealing member can be accurately performed.

In a specific aspect, the speaker is fixed in a predetermined posture with respect to the mounting member by a holder member provided in an acoustic chamber of the mounting member. In this case In a specific aspect, a microphone that is fixed to the holder member in a predetermined posture different from that of the speaker and configured to collect sound downward. In this case, it is possible to accurately capture sound of the wearer while the sound of the speaker being picked up by the microphone is avoided.

In a specific aspect, the speaker is configured as a pair of left and right speakers, and one of the speakers has a cable insertion hole in addition to the hole for the opening portion. In this case, a simple and compact configuration can be achieved.

In a specific aspect, the speaker is waterproof or configured by providing a waterproof cloth in the opening portion. In this case, waterproofing can be enhanced while a simple configuration is maintained.

An acoustic device according to a specific aspect includes a speaker, a mounting member on which the speaker is mounted, and a temple member coupled to the mounting member, and the speaker has an opening portion for sound output at a coupling portion between the mounting member and the temple member.

In the above acoustic device, since the speaker is mounted on the mounting member, for example, wiring for sound transmission on the temple member side is not necessary, and the structure related to sound in the temple member and the periphery thereof can be simplified, and also since the opening portion for sound output of the speaker is provided at the coupling portion between the mounting member and the temple member, it is possible to maintain a state in which the sound of the speaker can be reliably transmitted to the ear of the observer In a particular aspect, the temple member includes a hollow member that guides sound output from the opening portion of the speaker. In this case, since the hollow structure is provided in the temple member, it is possible to increase the degree of freedom in design or the like when the sound output from the opening portion of the speaker is guided to the ears of the observer.

What is claimed is:

1. A virtual image display device comprising:
    a display element;
    a mounting member configured to fix the display element;
    a temple member coupled to the mounting member;
    a speaker mounted on the mounting member, wherein
    the speaker has an opening portion for sound output at a coupling portion between the mounting member and the temple member; and
    a hinge provided at the coupling portion and configured to rotate, wherein
    the temple member includes a hollow member that guides sound output from the opening portion of the speaker, and
    in the temple member, a sound guide inlet of the hollow member comes into contact with the opening portion in a state in which the temple member is opened by rotating the hinge.

2. The virtual image display device according to claim 1, wherein
    the hollow member is formed of a hard resin, glass fiber, or a metal.

3. The virtual image display device according to claim 1, wherein
    the sound guide outlet of the hollow member is a laterally long hole.

4. The virtual image display device according to claim 1, wherein
    a position of the sound guide outlet of the hollow member is adjustable.

5. The virtual image display device according to claim 1, wherein the hollow member is coated with a water repellent agent on an inner side of the sound guide path.

6. The virtual image display device according to claim 1, further comprising:

a plate-like member configured to form the coupling portion, wherein the opening portion is formed by attaching a cushioning sealing member to a hole provided in the plate-like member.

7. The virtual image display device according to claim 6, wherein the plate-like member has a stepped groove at a position at which the sealing member is attached.

8. The virtual image display device according to claim 1, wherein the speaker is fixed in a predetermined posture with respect to the mounting member by a holder member provided in an acoustic chamber of the mounting member.

9. The virtual image display device according to claim 8, further comprising a microphone fixed to the holder member in a predetermined posture different from that of the speaker and configured to collect sound downward.

10. The virtual image display device according to claim 1, wherein the speaker is configured as a pair of left and right speakers, and one of the speakers has a cable insertion hole in addition to the hole for the opening portion.

11. The virtual image display device according to claim 1, wherein the speaker is waterproof or is provided with a waterproof cloth in the opening portion.

12. An acoustic device comprising:

a speaker;

a mounting member on which the speaker is mounted;

a temple member coupled to the mounting member, wherein the speaker has an opening portion for sound output at a coupling portion between the mounting member and the temple member; and a hinge provided at the coupling portion and configured to rotate, wherein the temple member includes a hollow member that guides sound output from the opening portion of the speaker, and in the temple member, a sound guide inlet of the hollow member comes into contact with the opening portion in a state in which the temple member is opened by rotating the hinge.

* * * * *